United States Patent
Shimura et al.

(10) Patent No.: US 10,001,687 B2
(45) Date of Patent: Jun. 19, 2018

(54) LIQUID CRYSTAL DISPLAY DEVICE

(71) Applicant: Japan Display Inc., Minato-ku (JP)

(72) Inventors: Masato Shimura, Minato-ku (JP);
Shunsuke Yuge, Minato-ku (JP);
Hiroshi Miyairi, Minato-ku (JP);
Tomokazu Ishikawa, Minato-ku (JP);
Tomonori Nishino, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 121 days.

(21) Appl. No.: 15/245,804

(22) Filed: Aug. 24, 2016

(65) Prior Publication Data
US 2017/0090257 A1      Mar. 30, 2017

(30) Foreign Application Priority Data

Sep. 28, 2015 (JP) .................. 2015-189675

(51) Int. Cl.
*G02F 1/1337*    (2006.01)
*G02F 1/1362*    (2006.01)
*G02F 1/1343*    (2006.01)

(52) U.S. Cl.
CPC .. *G02F 1/136227* (2013.01); *G02F 1/134336* (2013.01)

(58) Field of Classification Search
CPC ............. G02F 1/1337; G02F 1/133711; G02F 1/136227; G02F 1/134336
USPC ........................................................... 349/123
See application file for complete search history.

(56) References Cited

U.S. PATENT DOCUMENTS

2013/0321752 A1* 12/2013 Asakawa .............. G02F 1/1337
349/128

FOREIGN PATENT DOCUMENTS

| JP | 11-183929 | 7/1999 |
|---|---|---|
| JP | 2002-289864 | 10/2002 |
| JP | 2010-72457 | 4/2010 |

* cited by examiner

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

In a high-resolution liquid crystal display device, measures against display unevenness caused by generation of a region where no alignment film is applied are provided. A liquid crystal display device includes a pixel formed between a scanning line and a video signal line. The pixel includes a TFT, a pixel electrode, and a contact hole connecting the TFT and the pixel electrode. The contact hole is formed in an insulation film formed between the pixel electrode and the TFT. Assuming that a horizontal pitch of the video signal line is ph and a horizontal diameter of the contact hole is dh, ph is 26 μm or less and s/ph is 0.73 or more where s=ph−dh. A tapered angle of a sidewall of the contact hole is 53 degrees or less. A thickness of an alignment film over the pixel electrode is 110 nm or more.

15 Claims, 15 Drawing Sheets

FIG. 8

TABLE 1

| ph (μm) | dh (μm) | dv (μm) | S (μm) | cos(θ) | h (μm) | at (nm) |
|---|---|---|---|---|---|---|
| 26 | 7 | 7 | 19 | 0.592 | 2.5 | 110 |
| 20 | 4 | 4 | 16 | 0.592 | 2 | 110 |
| 15 | 3 | 3 | 12 | 0.592 | 1.5 | 115 |

FIG. 9

TABLE 2

| ph (μm) | S (μm) | S/ph (%) |
|---|---|---|
| 26 | 19 | 73 |
| 20 | 16 | 80 |
| 15 | 12 | 80 |

LIQUID CRYSTAL DISPLAY DEVICE

CLAIM OF PRIORITY

The present application claims priority from Japanese Patent Application JP 2015-189675 filed on Sep. 28, 2015, the content of which is hereby incorporated by reference into this application.

BACKGROUND

The present invention relates to a display device and, in particular, relates to a liquid crystal display device in which measures against display unevenness caused by generation of a region where no alignment film is formed in a case where the screen resolution is increased.

A liquid crystal display device has a configuration in which a TFT substrate, on which pixels each including a pixel electrode, a thin film transistor (TFT), and the like are formed in a matrix and a counter substrate opposed to the TFT substrate are arranged with a liquid crystal sandwiched between the TFT substrate and the counter substrate. A transmittance of light by liquid crystal molecules is controlled on a pixel-by-pixel basis, to form an image.

In the liquid crystal display device, alignment films are respectively formed on the TFT substrate and the counter substrate to cause initial alignment of the liquid crystal molecules. On the TFT substrate side, unevenness can easily occur because various elements, e.g., contact holes and the pixel electrodes, are formed. In particular, a contact hole allowing a source electrode of the TFT to be electrically conductive to a corresponding pixel electrode has a large diameter, and therefore largely affects the uniformity of application of the alignment film.

Japanese Unexamined Patent Application Publication No. 2002-289864 describes a configuration in which a tapered shape of a contact hole is changed in three levels to prevent occurrence a void at the bottom of the contact hole, thereby eliminating a failure of electrical continuity in the contact hole. Japanese Unexamined Patent Application Publication No. 2010-072457 describes a configuration in which an angle of a wall surface of a contact hole is made small so that a failure of electrical continuity in the contact hole is prevented. Japanese Unexamined Patent Application Publication No. Hei11 (1999)-183929 describes a configuration in which a radius of curvature of an upper cross section of a contact hole is defined to prevent a failure of electrical continuity in the contact hole.

SUMMARY

In a small liquid crystal display device, in particular, the resolution has been increasing. As the resolution increases, the area of a pixel becomes small, and therefore a ratio of the area of the contact hole for connecting the pixel electrode and the source electrode of the corresponding TFT in the pixel increases. Further, an interval between the contact holes in different pixels is also reduced.

In the liquid crystal display device, the alignment film for causing initial alignment of the liquid crystal molecules is formed. The material of this alignment film is originally liquid, and is baked after being applied, so that the alignment film is obtained. As the contact hole becomes smaller, a probability that the alignment film is repelled and is not formed in the contact hole increases. However, in a case where no alignment film is formed in an individual contact hole, a significant failure hardly occurs in terms of alignment of the liquid crystal molecules. This is because a region of the contact hole is shielded for light, so that the region is not used for image formation directly.

Meanwhile, when the regions having no alignment film are linked to each other, the area where no alignment film is formed increases. This continuous region appears as display unevenness. FIG. 4 illustrates an example of such display unevenness. As illustrated in FIG. 4, display unevenness 50 in the form of an island is generated in a display region 500. This shows that the regions having no alignment film exist in a plurality of pixels and are linked to cause display unevenness that can be recognized by eyes.

A problem to be soled by the present invention is to prevent generation of display unevenness that can be recognized by eyes caused by a region having no alignment film spreading over a plurality of pixels, even when the resolution is increased.

The present invention solves the above problem, and specific measures are as follows.

(1) A liquid crystal display includes: a TFT substrate having pixels formed between scanning lines that extend in a first direction and are arranged in a second direction and video signal lines that extend in the second direction and are arranged in the first direction, the pixels each having a TFT, a pixel electrode, and a contact hole for connecting the TFT and the pixel electrode; a counter substrate; and a liquid crystal sandwiched between the TFT substrate and the counter substrate. In the liquid crystal display device, an alignment film is formed over the pixel electrode. The contact hole is formed in an insulation film formed between the pixel electrode and the TFT. When a pixel pitch in the first direction is ph and a diameter of the contact hole in the first direction is dh, ph is 26 μm or less. When s is defined as ph−dh, s/ph is 0.73 or more. A tapered angle of a sidewall of the contact hole is 53 degrees or less, and a thickness of the alignment film over the pixel electrode is 110 nm or more.

(2) The liquid crystal display device has the configuration of (1) except that ph is 20 μm or less, and s/ph is 0.8 or more when s is defined as ph−dh.

(3) A liquid crystal display device includes: a TFT substrate in which a pair of a first scanning line and a second scanning line extends in a first direction and is arranged in a second direction, a pair of a first video signal line and a second video signal line extends in the second direction and is arranged in the first direction, and first pixels and second pixels are arranged in the first direction side by side between the pair of scanning lines and between the first video signal line and the second video signal line, the first pixels are arranged in the second direction, and the second pixels are arranged in the second direction; a counter substrate; and a liquid crystal sandwiched between the TFT substrate and the counter substrate. The first pixels each include a first TFT, a first pixel electrode, and a first contact hole connecting the first TFT and the first pixel electrode. The second pixels each include a second TFT, a second pixel electrode, and a second contact hole connecting the second TFT and the second pixel electrode. When a pitch of the first pixel and the second pixel in the first direction is ph and a diameter of the first contact hole and the second contact hole in the first direction is dh, ph is 26 μm or less. When a shortest distance between the first contact hole and the second contact hole is s, s/ph is 0.73 or more. An alignment film is formed over the first pixel electrode or the second pixel electrode. A tapered angle of sidewalls of the first contact hole and the second contact hole is 53 degrees or less. A thickness of the alignment film over the first pixel electrode or the second pixel electrode is 110 nm or more.

(4) The liquid crystal display device has the configuration of (3) except that ph is 20 μm or less, and s/ph is 0.8 or more when the shortest distance between the first contact hole and the second contact hole is s.

(5) A liquid crystal display device includes: a TFT substrate including a display region having a first pixel line of first pixels for displaying a first color arranged in a second direction with a pitch of pv, and a second pixel line of second pixels for displaying a second color arranged in the second direction with the pitch of pv, the first pixel line and the second pixel line being adjacent to each other in a first direction with a pitch of ph; a counter substrate; and a liquid crystal sandwiched between the TFT substrate and the counter substrate. The first pixels each include a first TFT, a first pixel electrode, and a first contact hole connecting the first TFT and the first pixel electrode. The second pixels each include a second TFT, a second pixel electrode, and a second contact hole connecting the second TFT and the second pixel electrode. A center of the first pixel and a center of the second pixel are shifted in the second direction in a range from pv/4 to pv/2. When a distance between the first contact hole and the second contact hole is s and a diameter in the first direction of the first contact hole and the second contact hole is dh, s/ph is 0.73 or more. A step is formed between the first pixel line and the second pixel line in a side of the display region, the side extending in the first direction.

(6) The liquid crystal display has the configuration of (5) except that a diameter in the second direction of the first pixel in the first pixel line and a diameter in the second direction of the second pixel in the second pixel line are different from each other in the side of the display region extending in the first direction.

(7) The liquid crystal display has the configuration of (6) except that the side of the display region extending in the first direction is straight.

BRIEF DESCRIPTION OF THE DRAWINGS

FIG. 8 illustrates examples of parameters that can prevent generation of the region where no alignment film is applied spreading over a plurality of contact holes.

FIG. 9 illustrates relations between a horizontal pitch of pixels and a distance between the contact holes, that can prevent generation of the region where no alignment film is applied spreading over the contact holes.

DETAILED DESCRIPTION

Figure 1:
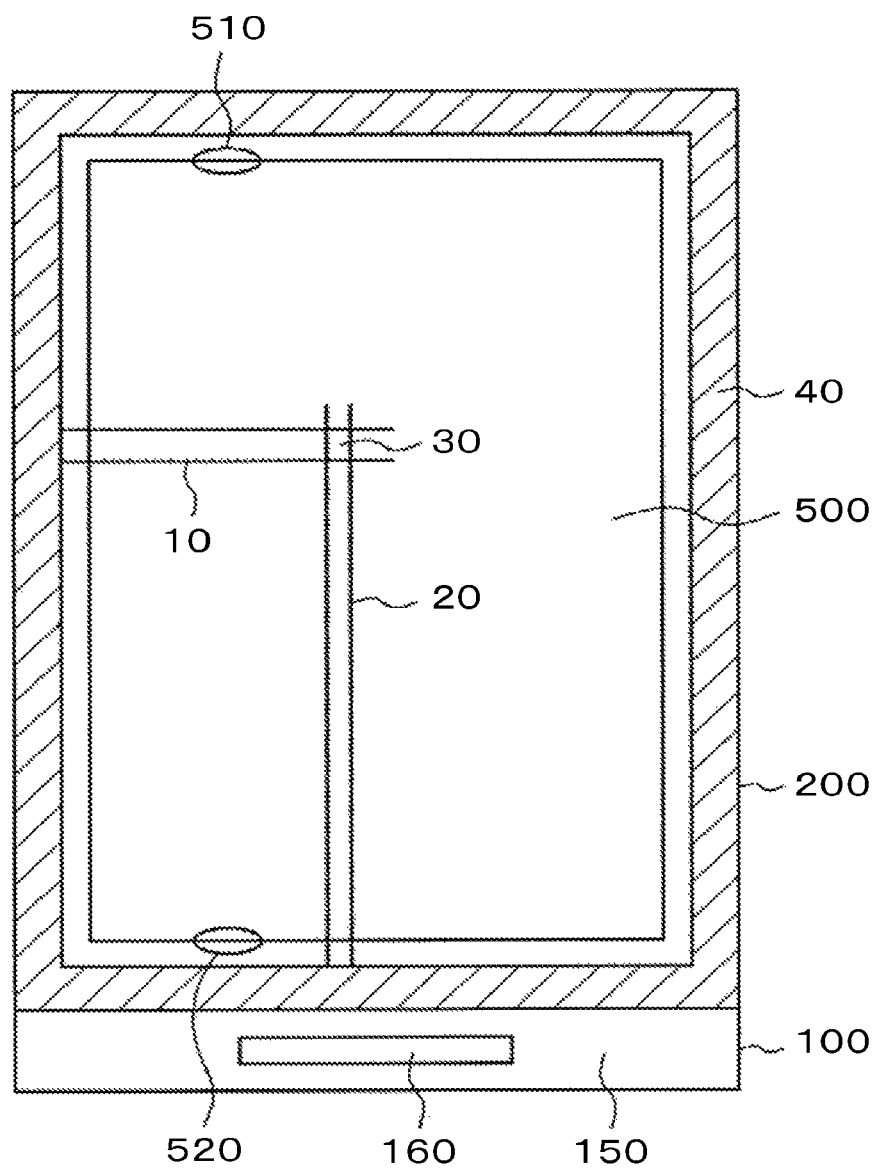
FIG. 1 is a plan view of a liquid crystal display device according to the present invention.

FIG. 1 is a plan view of a liquid crystal display device to which the present invention is applied. In FIG. 1, a TFT substrate 100 and a counter substrate 200 are bonded by a seal member 40, and a liquid crystal is sandwiched between the TFT substrate 100 and the counter substrate 200. The TFT substrate 100 is formed to be larger than the counter substrate 200. A portion of the TFT substrate 100, not overlapped by the counter substrate 200, is a terminal portion 150. The terminal portion 150 includes thereon terminals for connecting to an IC driver 160 that drives a liquid crystal, and a flexible wiring board that supplies a power source, a video signal, a scanning signal, and the like to a liquid crystal display panel, for example.

In FIG. 1, scanning lines 10 extend laterally and are arranged vertically in a display region 500. Also, video signal lines 20 extend vertically and are arranged laterally. A region surrounded by a scanning line 10 and a video signal line 20 is a pixel 30. When the resolution is increased, the area of this pixel 30 becomes smaller, for example, to 78 μm or less in the extending direction of the video signal line and 26 μm or less in the extending direction of the scanning line. The pixel 30 is any of a red pixel, a green pixel, and a blue pixel, depending on a color filter. Although a set of the red pixel, the green pixel, and the blue pixel may be called a pixel, this specification refers to each of the red pixel, the green pixel, and the blue pixel as the pixel 30, unless otherwise noted.

Figure 2:
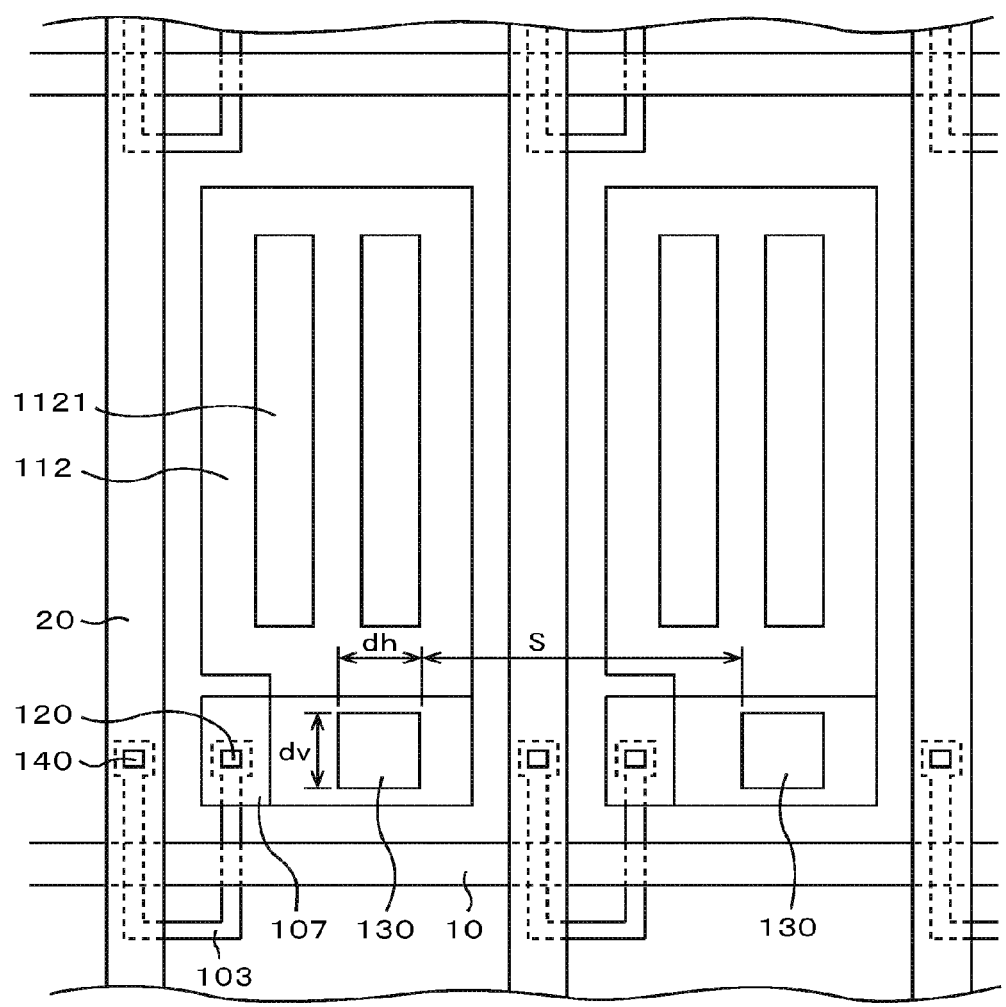
FIG. 2 is a plan view illustrating a pixel configuration according to a first embodiment.

FIG. 2 is a plan view of the pixel 30 in the TFT substrate 100. FIG. 2 illustrates a configuration including two pixels 30 horizontally arranged. FIG. 2 is a plan view of a pixel portion in an FFS (Fringe Field Switching) type liquid crystal display device. Although the description is made by referring to the FFS type in an IPS (In Plane Switching) type as an example in this specification, the present invention is not limited thereto, but can be applied to other liquid crystal display devices.

In FIG. 2, the scanning lines 10 extend laterally and are arranged vertically, while the video signal lines 20 extend vertically and are arranged laterally. Pixel electrodes 112 are respectively formed in regions surrounded by the scanning lines 10 and the video signal lines 20. In FIG. 2, a semiconductor layer 103 extends in a squared U-shape from a through hole 140 to pass below the scanning line 10 twice. A portion where the semiconductor layer 103 passes below the scanning line 10 is configured as a TFT. That is, the scanning line 10 acts as a gate electrode in this portion. The semiconductor layer 103 connects with a contact electrode 107 in a through hole 120, and the contact electrode 107 connects with the pixel electrode 112 in a contact hole 130. The pixel electrode 112 is a comb electrode having a slit 1121 therein. Although the pixel electrode 112 is the comb electrode having a plurality of teeth and a slit in FIG. 2, it may have a single tooth without a slit.

In this specification, a through hole connecting the semiconductor layer 103 and the video signal line 20 or the semiconductor layer 103 and the contact electrode 107 is referred to as a through hole, while a through hole connecting the contact electrode 107 and the pixel electrode 112 is referred to as the contact hole 130. Both the through hole and the contact hole are the same in function. The contact hole 130 has a large hole diameter because the hole is formed in an organic passivation film.

Because a large concave portion is formed in a portion of the contact hole 130, an alignment film material is repelled and can hardly enter into this portion when the alignment film material is applied. In the following description, the alignment film material may be simply referred to as an alignment film. In a case where the alignment film is repelled only by the contact hole, display unevenness is not a major problem. However, when regions where the alignment film is repelled are linked, a region having no alignment film therein becomes large, resulting in generation of the display unevenness illustrated in FIG. 4. Hereinafter, the region where no alignment film is formed is also referred to as a burst of the alignment film.

The burst of the alignment film is largely affected by the diameter of the contact hole 130 in FIG. 2 and the space between the contact holes 130. The diameter of the contact hole 130 includes a diameter dv in the direction of video signal lines (hereinafter, called a vertical diameter) and a diameter dh in the direction of scanning lines (hereinafter, called a horizontal diameter). The space s between the contact holes 130 is a smallest distance between the contact holes 130. In FIG. 2, a horizontal distance between the contact holes is the smallest distance. Although the contact hole 130 is rectangular in FIG. 2, the contact hole can have various shapes as will be described later. Note that the burst of the alignment film 130 is also affected by the depth and the cross-sectional shape of the contact hole that will be described later.

Figure 3:
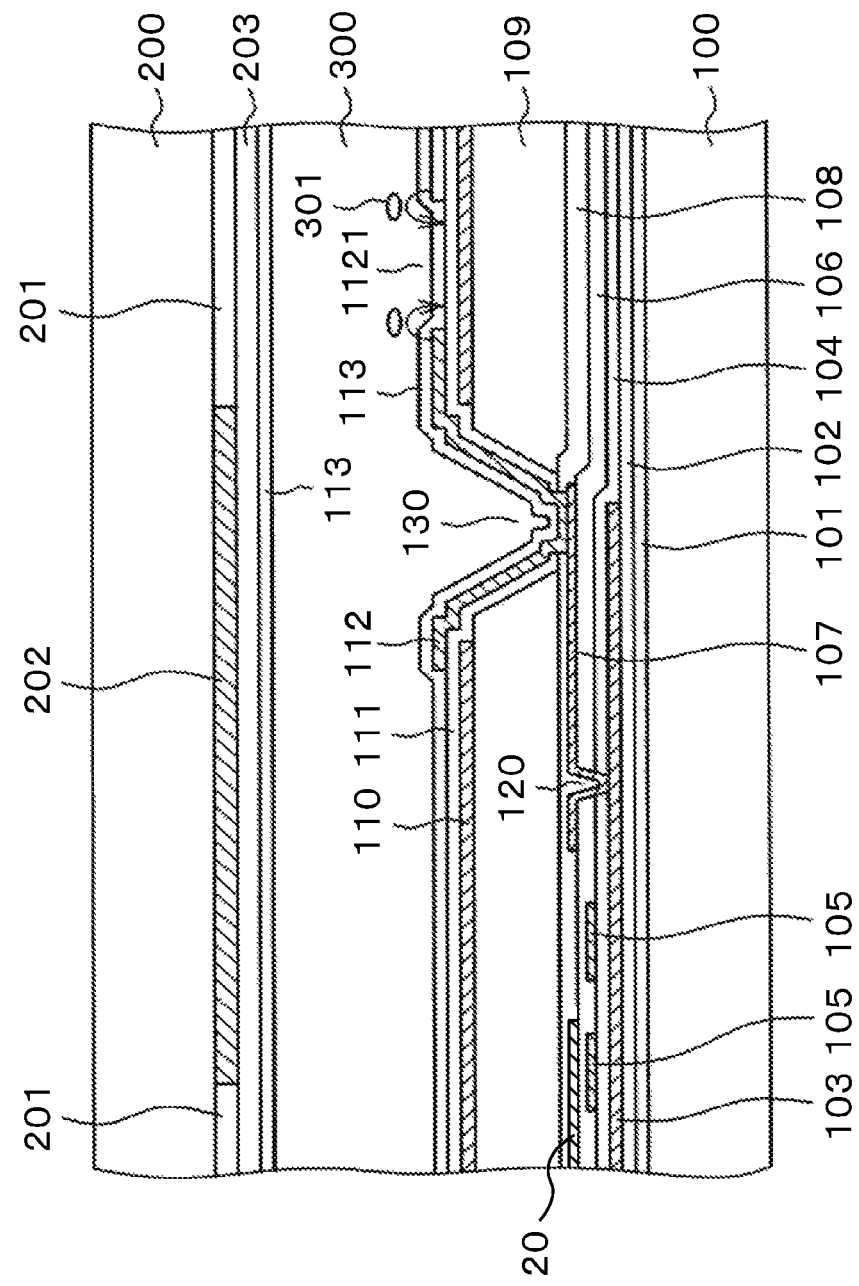
FIG. 3 is a cross-sectional view of the liquid crystal display device.

FIG. 3 is a cross-sectional view corresponding to FIG. 2. The TFT in FIG. 3 is a so-called top-gate TFT. The TFT uses LTPS (Low Temperature Poly-Si) as semiconductor. In FIG. 3, a first underlying film 101 of SiN and a second underlying film 102 of $SiO_2$ are formed by CVD (Chemical Vapor Deposition) on a glass substrate 100. The first underlying film 101 and the second underlying film 102 have a function of preventing impurities from the glass substrate 100 from contaminating the semiconductor layer 103.

The semiconductor layer 103 is formed on the second underlying film 102. This semiconductor layer 103 is obtained by forming an a-Si film by CVD on the second underlying film 102 and converting it to a poly-Si film by laser annealing. This poly-Si film is patterned by photolithography.

Agate insulation film 104 is formed on the semiconductor layer 103. This gate insulation film 104 is an $SiO_2$ film formed of TEOS (tetraethyl orthosilicate). This film is also formed by CVD. On this film is formed a gate electrode 105. The gate electrode 105 is formed by the scanning line 10 illustrated in FIG. 2. The semiconductor layer passes below the scanning line 10 twice, and therefore two gate electrodes 105 are arranged in FIG. 3. The gate electrode 105 is formed by a MoW film, for example.

A first interlayer insulation film 106 is formed of $SiO_2$ to cover the gate electrode 105. The first interlayer insulation film 106 is formed for insulating the gate electrode 105 and the contact electrode 107 from each other. The through hole 120 is formed for connecting the semiconductor layer 103 to the contact electrode 107 in the first interlayer insulation film 106 and the gate insulation film 104. Photolithography for forming the through hole 120 in the first interlayer insulation film 106 and the gate insulation film 104 is performed simultaneously.

The video signal line is formed on the first interlayer insulation film 106. The video signal line is connected to the semiconductor layer 103 in the through hole 140 illustrated in FIG. 2. That is, two TFTs are formed between the through hole 140 and the through hole 120 illustrated in FIG. 2. The contact electrode 107 is formed on the first interlayer insulation film 106 in the same layer as the video signal line 20. The contact electrode 107 is connected to the pixel electrode 112 via the contact hole 130. The video signal line 20 and the contact electrode 107 are formed of MoW, for example.

An inorganic passivation film 108 is formed of SiN, for example, to cover the video signal line 20 and the contact electrode 107, so that the film 108 protects the entire TFT. The inorganic passivation film 108 is formed by CVD, like the first underlying film 101. An organic passivation film 109 is formed to cover the inorganic passivation film 108. The organic passivation film 109 is formed of photosensitive acrylic resin. The organic passivation film 109 can be formed of silicone resin, epoxy resin, or polyimide resin, for example, other than the acrylic resin. Because the organic passivation film 109 has a function of a flattening film, it is formed to be thick. The thickness of the organic passivation film 109 is from 1 to 4 μm, while the film thickness is about 2 μm in many cases.

The contact hole 130 is formed in the inorganic passivation film 108 and the organic passivation film 109 in order to make the pixel electrode 112 and the contact electrode 107 electrically conductive. Photosensitive resin is used for the organic passivation film 109. When the photosensitive resin is applied and is then exposed with light, only a region exposed with light is dissolved in a specific developing solution. That is, the use of the photosensitive resin enables formation of photoresist to be omitted. After the contact hole 130 is formed in the organic passivation film 109, the organic passivation film 109 is baked at about 230° C., so that the organic passivation film 109 is completed.

Subsequently, an ITO (Indium Tin Oxide) film is formed by sputtering, which constitutes a common electrode 110, and is then patterned so that the ITO film is removed from the contact hole 130 and surroundings of the contact hole 130. The common electrode 110 can be formed in a planar shape to be common to the pixels. Thereafter, SiN forming a second interlayer insulation film 111 is deposited by CVD on the entire surface. Subsequently, in the contact hole 130, a through hole for achieving electric continuity between the contact electrode 107 and the pixel electrode 112 is formed in the second interlayer insulation film 111 and the inorganic passivation film 108. Thereafter, an ITO film is formed by sputtering and is patterned to form the pixel electrode 112. A planar shape of the pixel electrode 112 is illustrated in FIG. 2.

An alignment film material is applied onto the pixel electrode 112 by flexographic printing or inkjet printing, for example. The alignment film material is liquid when being applied, but it may not enter into the contact hole 130 because of its surface tension. In order to enable the alignment film material to easily enter into the contact hole 130, it is desirable that the depth of the contact hole be shallow and a degree of tapering of a sidewall of the contact hole be small. The depth of the contact hole can be considered as the thickness of the organic passivation film. Further, when the alignment film material is applied to be thick, the alignment film material can enter into the contact hole more easily. The depth of the contact hole, the degree of tapering of the sidewall, and the like will be described later.

After being applied, the alignment film material is baked to obtain an alignment film. This alignment film is subjected to an alignment process by rubbing or by an optical alignment process using ultraviolet rays. When a voltage is applied across the pixel electrode 112 and the common electrode 110, electric lines of force illustrated in FIG. 3 are generated. This electric field rotates liquid crystal molecules 301 to control the amount of light passing through a liquid crystal layer 300 on a pixel-by-pixel basis, so that an image is formed.

In FIG. 3, the counter substrate 200 is arranged with the liquid crystal layer 300 sandwiched between the TFT substrate 200 and the counter substrate 200. A color filter 201 is formed inside the counter substrate 200. As the color filter 201, a red filter, a green filter, and a blue filter are formed, depending on each pixel. With these filters, a color image is formed. A black matrix 202 is formed between the color filter 201 and the adjacent color filter 201, which improves a contrast of the image. The black matrix 202 also has a function of a light-shielding film of the TFT and prevents a photocurrent from flowing in the TFT.

An overcoat film 203 is formed to cover the color filter 201 and the black matrix 202. Because the surfaces of the color filter 201 and the black matrix 202 are uneven, they are flattened by the overcoat film 203. The alignment film 113 for determining initial alignment of the liquid crystal is formed on the overcoat film. Rubbing or an optical alignment method is used as the alignment process for the alignment film 113, as in the alignment film 113 on the TFT substrate 100 side.

Figure 5:
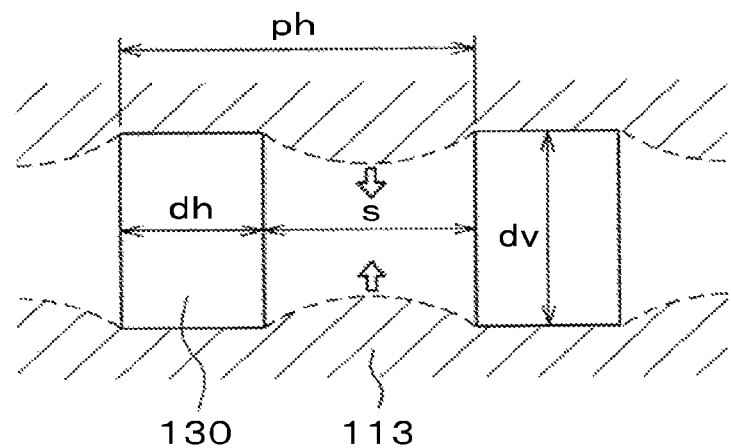
FIG. 5 schematically shows a state in which no alignment film is formed over a plurality of contact holes.

FIG. 5 is a schematic view illustrating generation of a region where no alignment film 113 is formed because of the existence of the contact hole 130. In FIG. 5, the contact hole 130 has a shape in which it is long in the vertical direction. In FIG. 5, the horizontal diameter of the contact hole is dh, the vertical diameter is dv, and the pitch of the contact hole 130, that is, the horizontal pixel pitch is ph. In FIG. 5, the space s between the contact holes 130 is large, the alignment film material can easily spread in a direction of white arrow and a probability of generation of the burst of the alignment film is small. Also, when the vertical diameter dv of the contact hole 130 is small, the alignment film material from the upper side and that from the lower side can be easily linked and therefore the burst of the alignment film can be hardly generated.

That is, when the horizontal pitch ph of the pixel 30 is determined, it is necessary to make both the horizontal diameter and the vertical diameter of the contact hole 130 small in order to prevent generation of the burst of the alignment film. The diameter of the contact hole 130 has a relation to the thickness of the organic passivation film and a profile of the cross section of the contact hole.

Figure 6:
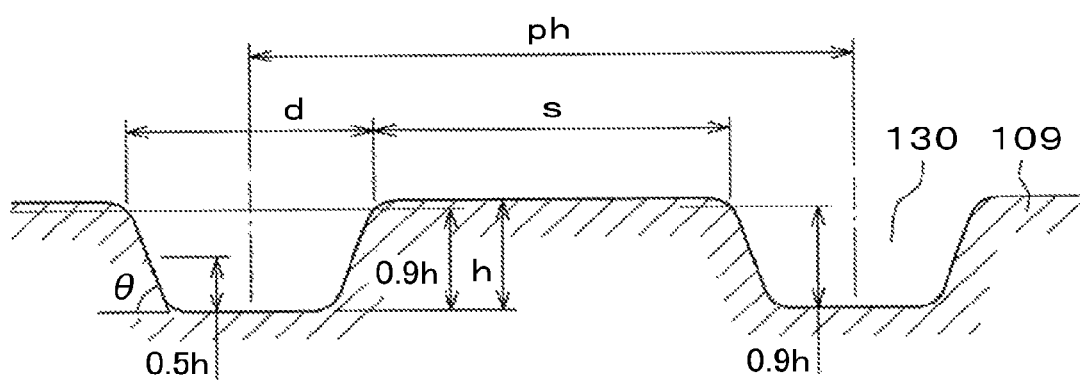
FIG. 6 is a detailed cross-sectional view of the contact hole.

FIG. 6 is a cross-sectional view of two contact holes. Because the thickness of the organic passivation film 109 is overwhelmingly larger than the thicknesses of other films, the profile of the contact hole 130 can be considered as a profile of a hole of the organic passivation film 130. The contact hole 130 is formed by photolithography, and therefore the profile thereof is a curve.

Thus, the diameter d of the contact hole 130 is defined as a diameter of the contact hole 130 at a height of 0.9 h from the bottom thereof, where the depth of the contact hole is defined as h. The distance s between the contact holes 130 is a distance in a plane in which the diameter of the contact hole 130 is defined. Meanwhile, a tapered angle e of the sidewall of the contact hole 130 is defined as a tapered angle of a side face at a level of h/2 from the bottom of the contact hole 130 when the depth of the contact hole 130 is defined as h.

As described in FIG. 5, it is desirable that the space s between the contact holes 130 be larger in order to eliminate the burst of the alignment film. Meanwhile, it is desirable that the tapered angle $\theta$ of the sidewall of the contact hole 130 be smaller in order to enable the alignment film material to easily enter into the contact hole. However, when the tapered angle $\theta$ of the sidewall of the contact hole 130 is made smaller, the diameter d of the contact hole becomes larger, and the space s inevitably becomes smaller in a case where the pitch ph of the contact hole 130, i.e., the pixel pitch ph is constant. In other words, to make $\theta$ smaller and to make s larger are conflicting conditions. A configuration satisfying these two conditions is to make the organic passivation film 109 thin. However, it is difficult to simply reduce the thickness of the organic passivation film 109 because the organic passivation film 109 has a function of reducing an inter-wire capacitance between lines and a flattening function.

In order to prevent generation of the burst of the alignment film even in a case where the resolution is increased, those conflicting conditions have to be overcome. Embodiments of the present invention are described below.

First Embodiment

Figure 7:
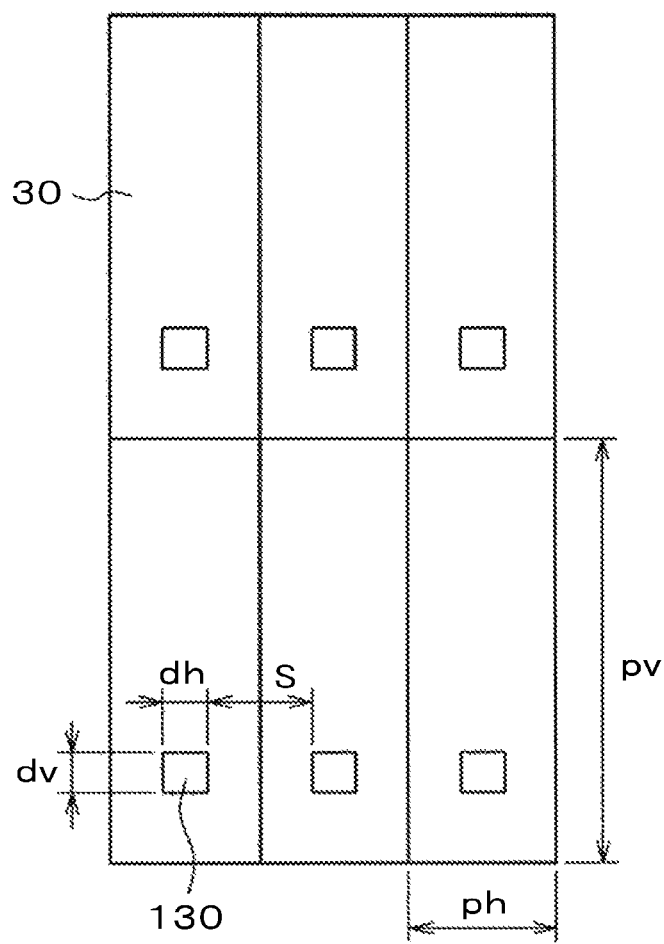
FIG. 7 is a plan view illustrating an arrangement of a pixel and the contact hole according to the first embodiment.

FIG. 7 is a plan view illustrating the position of the contact hole 130 in a normal pixel arrangement. In FIG. 7, the pitch of the pixel 30 in the horizontal direction is ph, the pitch in the vertical direction is pv, and pv=3 ph is established. The diameter of the contact hole 130 in the horizontal direction (hereinafter, the horizontal diameter) is dh and the diameter in the vertical direction (hereinafter, the vertical diameter) is dv. In FIG. 7, the smallest space s between the contact holes 130 is ph−dh.

Figure 4:
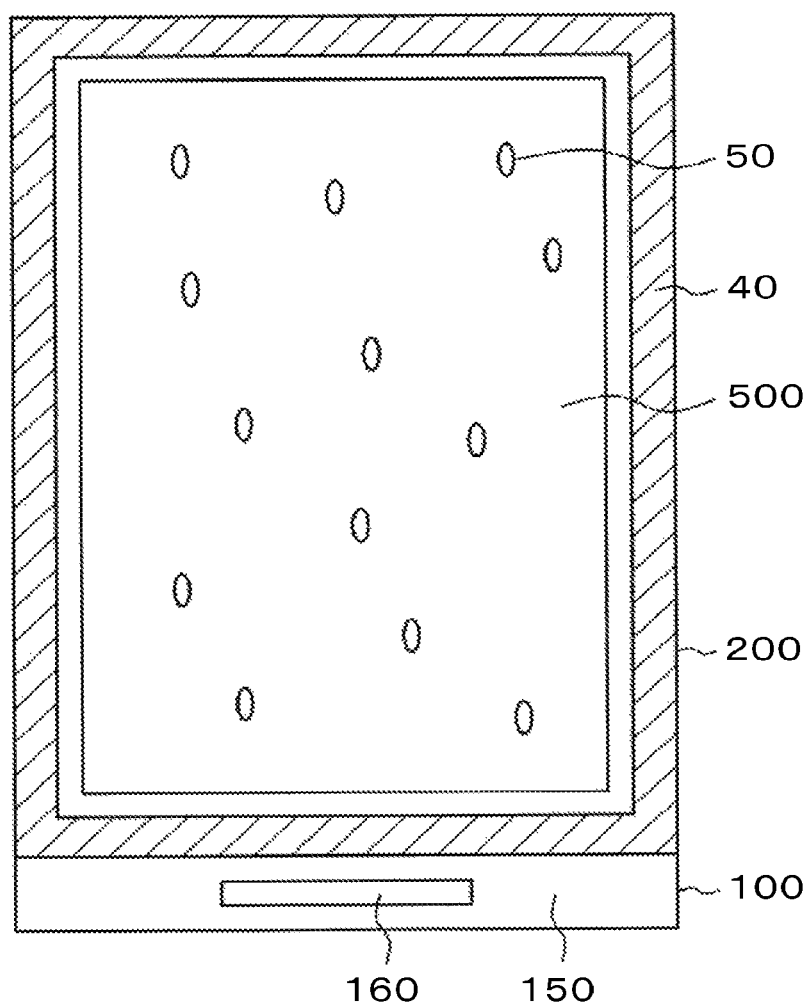
FIG. 4 shows an example of display unevenness caused by existence of a region having no alignment film therein.

In a case where the contact hole 130 exists solely, it can be considered that the alignment film material can hardly enter into the contact hole 130 when the diameter of the contact hole 130 is small. Meanwhile, the display unevenness caused by application unevenness of the alignment film illustrated in FIG. 4 is generated by no application of the alignment film in a wider area spreading over a plurality of contact holes 130. That is, it can be considered that the display unevenness is caused by unevenness of a surface condition caused by the existence of the contact hole 130.

When the pixel pitch ph becomes smaller, the space between the contact holes 130 also becomes narrower, and therefore the adjacent contact holes 130 affect each other, resulting in generation of a region where no alignment film is formed in a wide area. That is, in order to prevent generation of the region where no alignment film is applied, it is necessary to achieve a sufficient space between the contact holes 130. This finding is contrary to a conventional finding. According to the conventional finding, the following can be considered. In order to form the alignment film material within the contact hole 130, it is necessary to ensure a sufficient diameter of the contact hole 130. As the pixel pitch ph becomes smaller, a ratio of the distance between the contact holes 130 to the pixel pitch ph becomes smaller.

To the contrary, the present invention discloses that, in order to avoid the display unevenness caused by application unevenness of the alignment film, it is necessary to make the space between the contact holes 130 larger, and therefore a ratio of the diameter of the contact hole 130 to the pixel pitch ph has to be made smaller. In other words, in a case where the space between the contact holes 130 and the pixel pitch are assumed to be s and ph, respectively, it is necessary to make s/ph larger as the pixel pitch becomes smaller. This is because the display unevenness on the screen hardly appears in a case where no alignment film is formed in individual contact holes, whereas the display unevenness easily appears when the region where no alignment film is formed is generated to spread over a plurality of contact holes 130.

The factor of generation of the region where no alignment film is formed spreading over a plurality of contact holes 130 is not the pixel pitch ph and the distance between the contact holes 130 only. As illustrated in FIG. 5, the vertical diameter dv of the contact hole 130 is also one of the factors. As illustrated in FIG. 5, as the vertical diameter dv of the contact hole 130 is smaller, the alignment film material can be united from the upper and lower sides of the alignment film in FIG. 5, so that wide formation of the region where no alignment film is applied can be prevented. Further, as the tapered angle e of the sidewall of the contact hole 130 is smaller, the alignment film material can enter into the contact hole more easily. Consequently, formation of generation of the region where no alignment film is formed, spreading over a plurality of contact holes, can be prevented. Actually, the tapered angle $\theta$ of the sidewall of the contact hole does not directly affect the generation, but $\cos \theta$, i.e., cosine of the tapered angle affects.

Further, in order to make the tapered angle e of the sidewall of the contact hole 130 smaller, it is better that the depth h of the contact hole, that is, the thickness of the insulation film in which the contact hole 130 is formed is smaller. Furthermore, as the thickness of the alignment film is larger, a pressure of the alignment film material flowing into the contact hole 130 or to between the contact holes 130 becomes larger. Therefore, it is possible to prevent generation of the region where no alignment film is formed spreading over a plurality of contact holes more easily.

Table 1 in FIG. 8 illustrates evaluation of conditions for suppressing generation of the region where no alignment film is formed spreading over a plurality of contact holes, for each horizontal pixel pitch. Table 1 illustrates conditions that cause no display unevenness for the horizontal pixel pitch ph of 26 µm, 20 µm, and 15 µm. Parameters in Table 1 are cosine of the tapered angle $\theta$ of the sidewall of the contact hole, i.e., $\cos \theta$, the horizontal diameter dh of the contact hole, the vertical diameter dv of the contact hole, the depth h of the contact hole, i.e., the thickness of the insulation film in which the contact hole is formed, and the thickness at of the alignment film. The thickness at of the alignment film in this case is the thickness of the alignment film formed on the pixel electrode.

In Table 1, the distance s between the contact holes satisfies s=ph−dh, where the pixel pitch is ph and the horizontal diameter of the contact hole is dh. The horizontal diameter dh and the vertical diameter dv of the contact hole are set to be the same. However, the shape of the contact hole is not limited to a square. For example, even when dv is smaller than values in Table 1, the region where no alignment film is formed spreading over a plurality of contact holes can be avoided. In Table 1, $\cos \theta$ is 0.592 in each case. In other words, although $\theta$ is 53.7 degrees, it is possible to avoid generation of the region having no alignment film over a plurality of contact holes with a high probability when $\theta$ is smaller than 53.7 degrees. Further, in Table 1, the thickness of the alignment film is 110 nm in cases of the pixel pitch ph of 26 µm and 20 µm, for example. However, when the thickness of the alignment film is larger than this value, it is possible to avoid generation of the region having no alignment film over a plurality of contact holes.

In Table 1, the depth h of the contact hole, causing no burst of the alignment film, becomes shallower, as the pixel pitch ph becomes smaller. For example, in the case where the pixel pitch ph is 20 µm, it suffices that the depth h of the contact hole is 2 µm or less. In the case where the pixel pitch ph is 15 µm, it suffices that the depth h of the contact hole is 1.5 µm or less.

The spaces s between the contact holes, having the most significant influence on avoidance of generation of the region having no alignment film over a plurality of contact holes, are retrieved from Table 1, and relations between those spaces s and the pixel pitches ph are described in Table 2 in FIG. 9. In Table 2, in order to avoid generation of the region having no alignment film over a plurality of contact holes, a ratio s/ph of the distance s between the contact holes and the pixel pitch ph is 73% or more in the case of the pixel pitch of 26 µm, and 80% or more in the case of the pixel pitch of 20 µm or 15 µm. That is, as the pixel pitch is smaller, s/ph is larger. Note that s in Tables 1 and 2 is not limited to the horizontal distance, but can be considered as the smallest distance between the contact holes. In FIG. 7, s is the horizontal distance.

Figure 10:
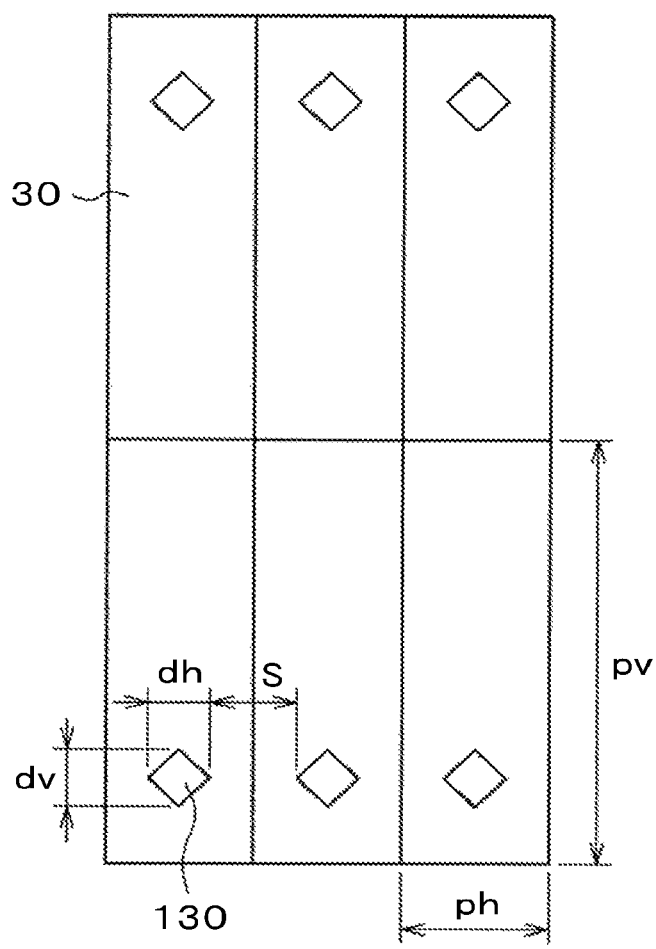
FIG. 10 illustrates another configuration example of the pixel and the contact hole according to the first embodiment.
Figure 11:
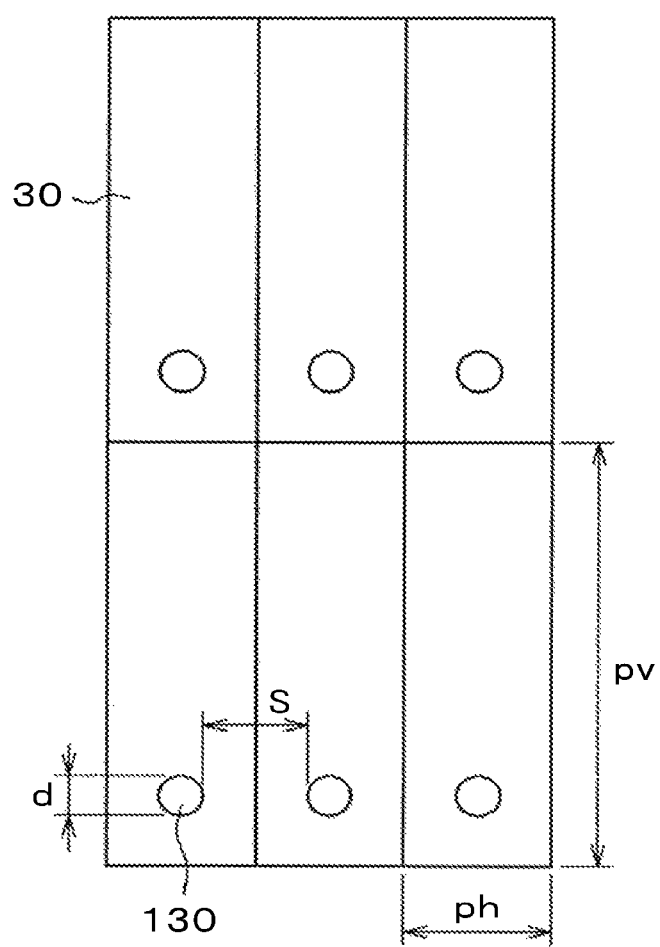
FIG. 11 illustrates further another configuration example of the pixel and the contact hole according to the first embodiment.

Although the planar shape of the contact hole 130 is square in FIG. 7, it is not limited thereto, but can be rectangular. Further, the planar shape of the contact hole 130 may be a rhombus as illustrated in FIG. 10. In a case where the contact hole 130 is a rhombus, the space s between the contact holes, the horizontal diameter dh and the vertical diameter dv of the contact hole, and the like are those illustrated in FIG. 10. Furthermore, the planar shape of the contact hole 130 may be circular, as illustrated in FIG. 11. In this case, the distance s between the contact hole 130 is illustrated in FIG. 11, and both the horizontal diameter dh and the vertical diameter dv of the contact hole 130 are d. The planar shape of the contact hole may be an ellipse or a long ellipse. In this case, the space s between the contact holes and the horizontal diameter dh and the vertical diameter dv of the contact hole, for example, are similar to those in FIG. 7.

As described above, even in a case where the pixel pitch is small, it is possible to suppress a phenomenon that the region where no alignment film is formed is generated to spread over a plurality of contact holes, by keeping the space between the contact holes to achieve a predetermined ratio or more with respect to the pixel pitch.

Second Embodiment

As described in the first embodiment, it is necessary to keep the space s between the contact holes to achieve a certain ratio or more with respect to the pixel pitch ph in order to suppress the phenomenon of generation of the region having no alignment film over a plurality of contact holes, even when the horizontal pixel pitch ph becomes small. However, there is a limit to the pixel arrangement illustrated in FIG. 7. This is because the diameter of the contact hole 130 becomes small in order to ensure the space s between the contact holes 130, making it difficult for the alignment film material from entering into individual contact holes 130.

Figure 12:
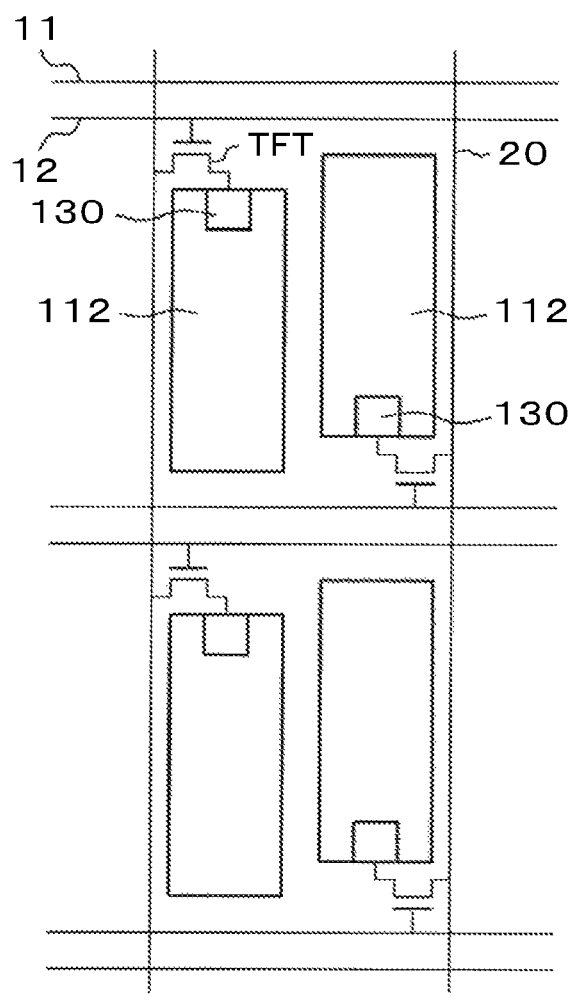
FIG. 12 is a plan view illustrating a pixel configuration according to a second embodiment.

FIG. 12 is a pixel configuration that can solve this problem. In FIG. 12, two pixels 30 are arranged between two video signal lines 20. The scanning line 10 is formed by a first scanning line 11 and a second scanning line 12. The first scanning line 11 supplies a scanning signal to a left pixel 30, and the second scanning line 12 supplies the scanning signal to a right pixel 30. In the configuration in FIG. 12, the number of the scanning lines is twice, whereas the number of the video signal lines is a half. Because the number of the video signal lines is twice or more the number of the scanning lines in general, the configuration in FIG. 12 can reduce a total number of wires.

Figure 13:
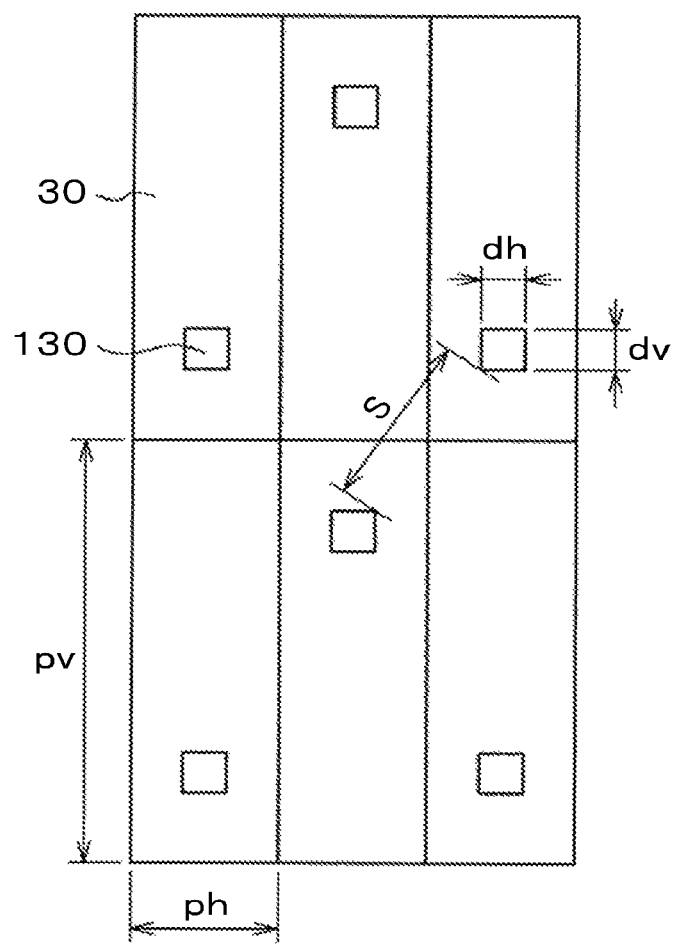
FIG. 13 is a plan view illustrating an arrangement of the pixel and the contact hole according to the second embodiment.

FIG. 13 is a plan view illustrating a pixel arrangement and an arrangement of the contact hole 130 in the wiring configuration in FIG. 12. As illustrated in FIG. 13, according to the present embodiment, the distance s between the contact holes 130 can be made larger than in the case of FIG. 7. In other words, it is possible to ensure the ratio s/ph of the distance s between the contact hole 130 and the pixel pitch ph, while the diameter of the contact hole 130 is kept to be a required diameter.

As described above, according to the present embodiment, even in a case where the pixel pitch becomes small, it is possible to more effectively suppress the phenomenon of generation of the region having no alignment film over a plurality of contact holes, by keeping the distance between the contact holes to achieve a predetermined ratio or more with respect to the pixel pitch.

Third Embodiment

Figure 14:
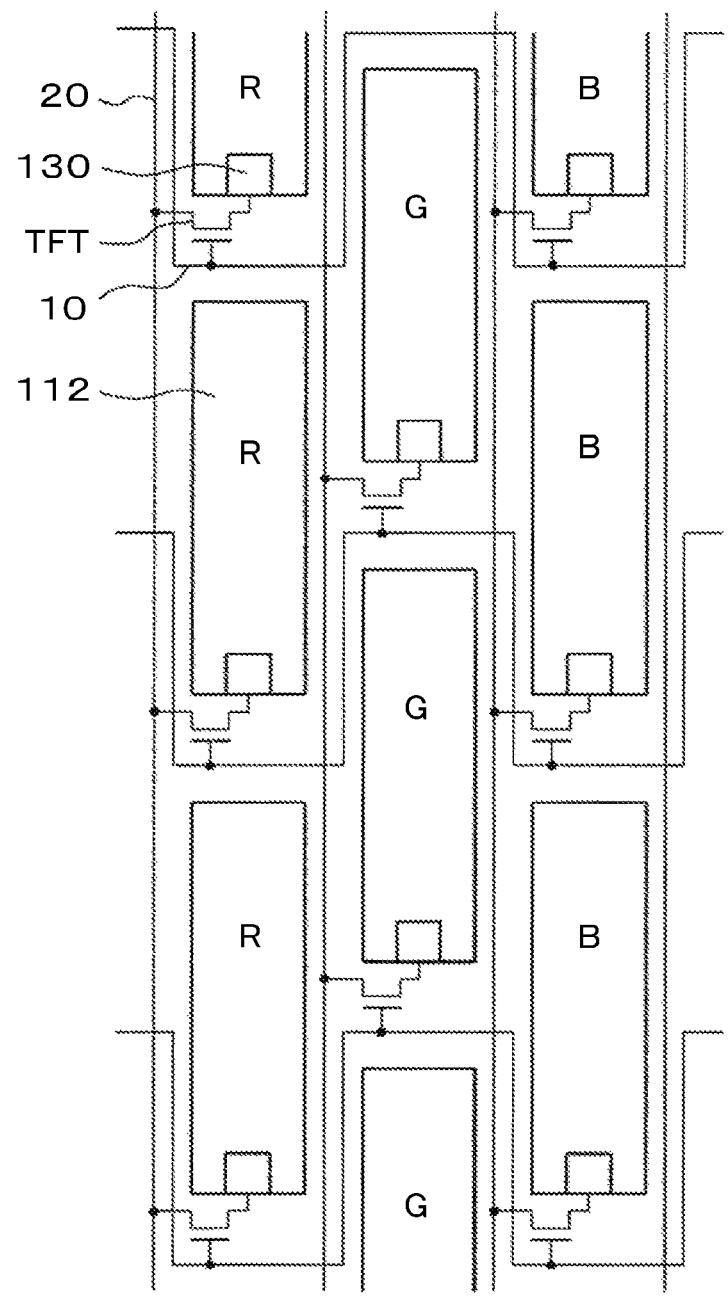
FIG. 14 is a plan view illustrating a pixel configuration according to a third embodiment.

FIG. 14 is a plan view illustrating a pixel configuration in a third embodiment. In FIG. 14, horizontally adjacent pixels 30 are arranged to be shifted in the vertical direction by ½ of the vertical pitch pv of the pixel 30. In FIG. 14, R, G, and B represent a red pixel, a green pixel, and a blue pixel, respectively. In FIG. 14, the scanning line 10 horizontally extends while cranking. This embodiment is the same as the first embodiment in that the pixel 30 exists between two video signal lines 20 and two scanning lines 10.

Figure 15:
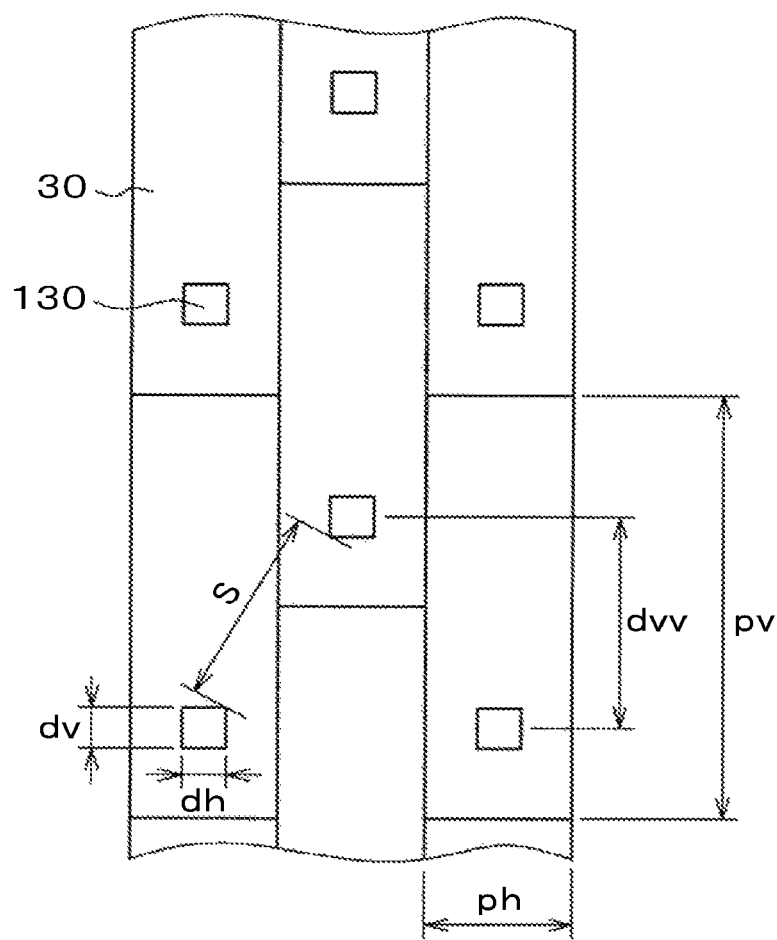
FIG. 15 is a plan view illustrating an arrangement of the pixel and the contact hole according to the third embodiment.

FIG. 15 is a plan view illustrating a pixel arrangement and an arrangement of the contact hole 130 in the wiring configuration in FIG. 14. In FIG. 15, the distance s between the closest contact holes can be made larger, as compared with the case of FIG. 7. That is, the ratio s/ph of the distance s between the contact holes 130 and the pixel pitch ph can be ensured, while the required diameter of the contact hole 130 is achieved.

Figure 16:
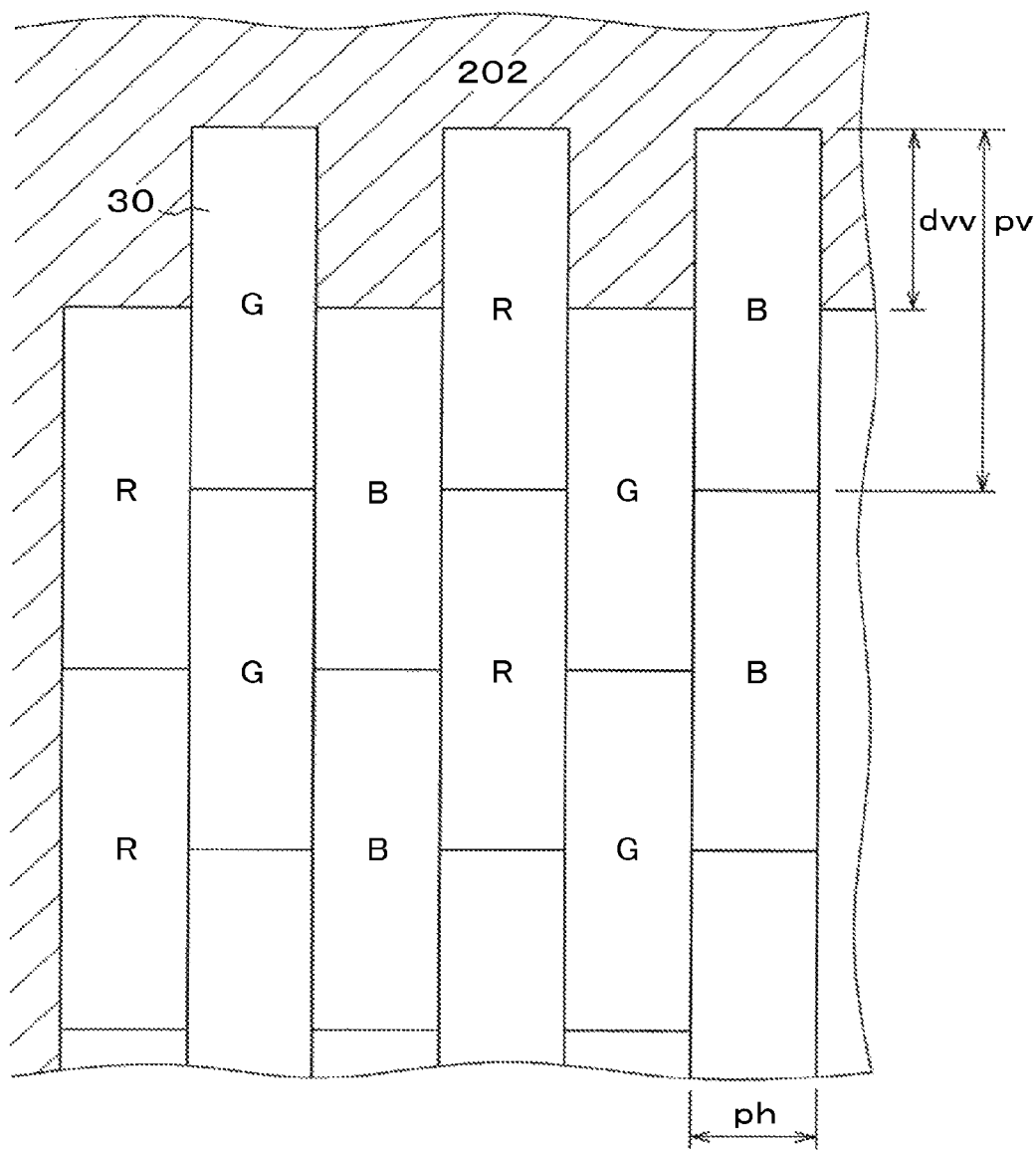
FIG. 16 illustrates a first example of a state of an end portion of a display region according to the third embodiment.

In the pixel configurations illustrated in FIGS. 14 and 15, the shape of an upper side 510 or a lower side 520 of the display region 500 in FIG. 1 may be a problem. FIG. 16 is a plan view illustrating the details of the upper side 520 of the display region in the pixel configuration illustrated in FIG. 15. As illustrated in FIG. 16, a step dvv is generated in the upper side 520 between adjacent pixels. It can be considered that the step dvv is usually inconspicuous when being ½ of the vertical diameter pv of the pixel 30 or less.

Meanwhile, in order to achieve a sufficient space between the contact holes 130, it is necessary to employ the pixel arrangement illustrated in FIG. 15. When the vertical shift dvv of the pixel 30 is set to be ¼ of the vertical pitch pv of the pixel 30 or more, the effect of the present embodiment can be expected. This is the same for the lower side 520 of the display region in FIG. 1.

Figure 17:
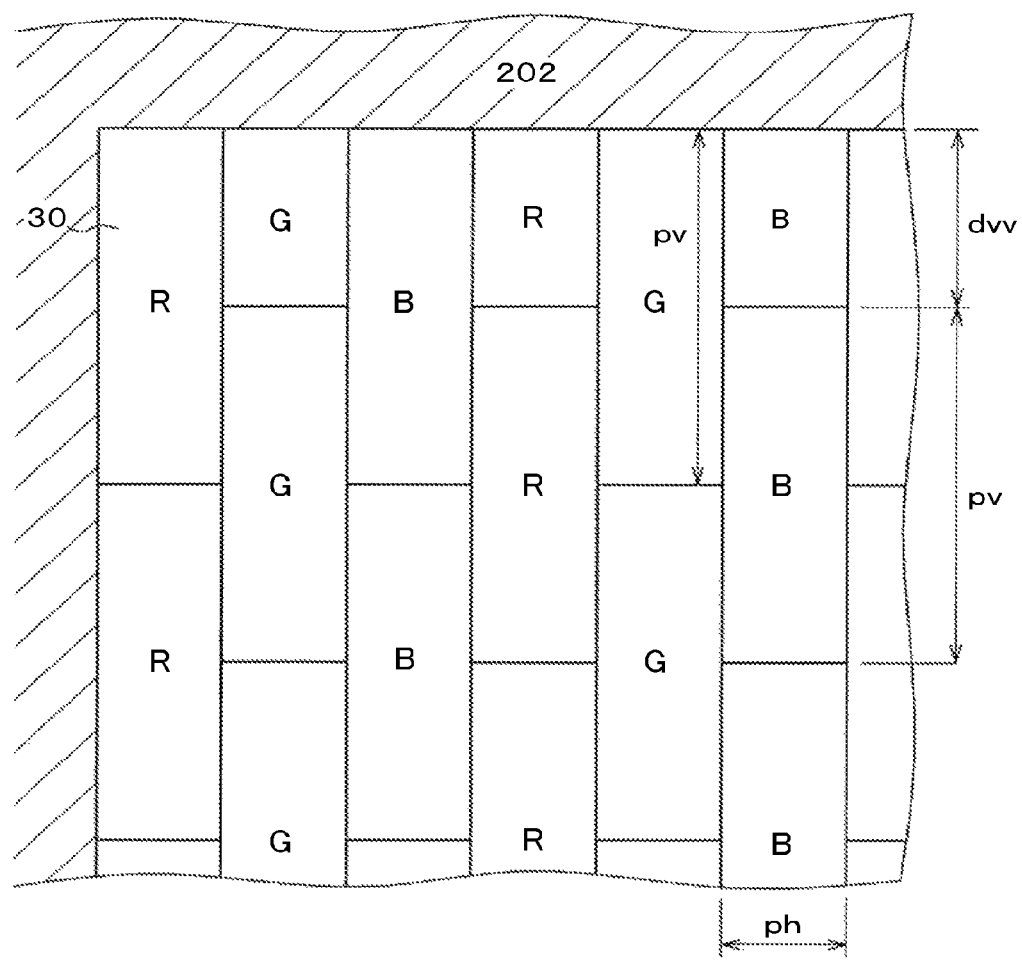
FIG. 17 illustrates a second example of a state of the end portion of the display region according to the third embodiment.

In some products, however, it is desirable that an end portion of the upper side 510 or the lower side 520 of the display region to be as straight as possible. In this case, it suffices that the vertical diameter of the pixel 30 at the end portion is made different alternately, as illustrated in FIG. 17. Also in this case, by setting the relation between the shift amount dvv in the vertical direction and the vertical pitch pv of the pixel 30, i.e., dvv/pv to be ¼ or more and ½ or less, the shift can be made inconspicuous.

As described above, even in a case where the pixel pitch becomes small according to the present embodiment, it is possible to more effectively suppress the phenomenon of generation of region having no alignment film over a plurality of contact holes, by keeping the space between the contact holes to achieve a predetermined ratio or more with respect to the pixel pitch. Further, it is possible to minimize the influence of shifting the pixel pitch alternately on the shape of the end portion of the display region.

What is claimed is:

1. A liquid crystal display comprising:
   a first substrate including pixels each having a thin film transistor and a pixel electrode, an insulation film provided between the thin film transistor and the pixel electrode, and an alignment film;
   a second substrate; and
   a liquid crystal sandwiched between the first substrate and the second substrate, wherein
   the thin film transistor and the pixel electrode are connected through a contact hole provided in the insulation film,
   when a pixel pitch in a first direction is ph and a diameter of the contact hole in the first direction is dh, ph is 26 µm or less,
   when s is defined as ph−dh, s/ph is 0.73 or more,
   a tapered angle of a sidewall of the contact hole is 53 degrees or less, and
   a thickness of the alignment film located between the pixel electrode and the liquid crystal is 110 nm or more.

2. The liquid crystal display device according to claim 1, wherein the diameter of the contact hole in the first direction is 7 µm or less.

3. A liquid crystal display comprising:
   a first substrate including pixels each having a thin film transistor and a pixel electrode, an insulation film provided between the thin film transistor and the pixel electrode, and an alignment film;
   a second substrate; and
   a liquid crystal sandwiched between the first substrate and the second substrate, wherein
   the thin film transistor and the pixel electrode are connected through a contact hole provided in the insulation film,
   when a pixel pitch in a first direction is ph and a diameter of the contact hole in the first direction is dh, ph is 20 µm or less,
   when s is defined as ph−dh, s/ph is 0.8 or more,
   a tapered angle of a sidewall of the contact hole is 53 degrees or less, and
   a thickness of the alignment film located between the pixel electrode and the liquid crystal is 110 nm or more.

4. The liquid crystal display device according to claim 3, wherein the diameter of the contact hole in the first direction is 4 µm or less.

5. The liquid crystal display device according to claim 3, wherein the thickness of the alignment film located between the pixel electrode and the liquid crystal is 115 nm or more.

6. A liquid crystal display device comprising:
a first substrate including a first scanning line and a second scanning line that extend in a first direction and are arranged in a second direction, a first video signal line and a second video signal line arranged in the first direction, and a first pixel and a second pixel arranged in the first direction side by side between the first scanning line and the second scanning line;
a second substrate; and
a liquid crystal sandwiched between the first substrate and the second substrate, wherein
the first pixel includes a first TFT and a first pixel electrode that are connected to each other through a first contact hole provided in an insulation film between the first TFT and the first pixel electrode,
the second pixel includes a second TFT and a second pixel electrode that are connected to each other through a second contact hole provided in an insulation film between the second TFT and the second pixel electrode,
when a pitch of the first pixel and the second pixel in the first direction is ph and a diameter of the first contact hole and the second contact hole in the first direction is dh, ph is 26 μm or less,
when a shortest distance between the first contact hole and the second contact hole is s, s/ph is 0.73 or more,
an alignment film is formed between the first and second pixel electrodes and the liquid crystal,
a tapered angle of sidewalls of the first and second contact holes is 53 degrees or less, and
a thickness of the alignment film between the first and second pixel electrodes and the liquid crystal is 110 nm or more.

7. The liquid crystal display device according to claim 6, wherein
the first pixels are arranged in the second direction with a pitch of pv to form a first pixel line,
the second pixels are arranged in the second direction with the pitch of pv to form a second pixel line, and
a step is formed between the first pixel line and the second pixel line in a side of a display region, the side extending in the first direction.

8. The liquid crystal display device according to claim 7, wherein the step is from pv/4 to pv/2.

9. The liquid crystal display device according to claim 6, wherein
the first pixels are arranged in the second direction with a pitch of pv to form a first pixel line,
the second pixels are arranged in the second direction with the pitch of pv to form a second pixel line, and
a diameter in the second direction of the first pixel in the first pixel line and a diameter in the second direction of the second pixel in the second pixel line are different from each other in a side of a display region, the side extending in the first direction.

10. The liquid crystal display device according to claim 9, wherein
the side of the display region extending in the first direction is straight.

11. A liquid crystal display device comprising:
a first substrate including a first scanning line and a second scanning line that extend in a first direction and are arranged in a second direction, a first video signal line and a second video signal line arranged in the first direction, and a first pixel and a second pixel arranged in the first direction side by side between the first scanning line and the second scanning line;
a second substrate; and
a liquid crystal sandwiched between the first substrate and the second substrate, wherein
the first pixel includes a first TFT and a first pixel electrode that are connected to each other through a first contact hole provided in an insulation film between the first TFT and the first pixel electrode,
the second pixel includes a second TFT and a second pixel electrode that are connected to each other through a second contact hole provided in an insulation film between the second TFT and the second pixel electrode,
when a pitch of the first pixel and the second pixel in the first direction is ph and a diameter of the first contact hole and the second contact hole in the first direction is dh, ph is 20 μm or less,
when a shortest distance between the first contact hole and the second contact hole is s, s/ph is 0.8 or more,
an alignment film is formed between the first and second pixel electrodes and the liquid crystal,
a tapered angle of sidewalls of the first and second contact holes is 53 degrees or less, and
a thickness of the alignment film between the first and second pixel electrodes and the liquid crystal is 110 nm or more.

12. The liquid crystal display device according to claim 11, wherein
the first pixels are arranged in the second direction with a pitch of pv to form a first pixel line,
the second pixels are arranged in the second direction with the pitch of pv to form a second pixel line, and
a step is formed between the first pixel line and the second pixel line in a side of a display region, the side extending in the first direction.

13. The liquid crystal display device according to claim 12, wherein the step is from pv/4 to pv/2.

14. The liquid crystal display device according to claim 11, wherein
the first pixels are arranged in the second direction with a pitch of pv to form a first pixel line,
the second pixels are arranged in the second direction with the pitch of pv to form a second pixel line, and
a diameter in the second direction of the first pixel in the first pixel line and a diameter in the second direction of the second pixel in the second pixel line are different from each other in a side of a display region, the side extending in the first direction.

15. The liquid crystal display device according to claim 14, wherein
the side of the display region extending in the first direction is straight.

* * * * *